(12) United States Patent
Desai et al.

(10) Patent No.: US 12,413,983 B1
(45) Date of Patent: Sep. 9, 2025

(54) ADAPTIVE CHANNEL ASSIGNMENT FOR 6GHZ RADIOS

(71) Applicant: Cisco Technology, Inc., San Jose, CA (US)

(72) Inventors: Vishal Satyendra Desai, San Jose, CA (US); Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 475 days.

(21) Appl. No.: 17/820,749

(22) Filed: Aug. 18, 2022

(51) Int. Cl.
*H04W 16/10* (2009.01)
*H04W 48/16* (2009.01)
*H04W 72/0453* (2023.01)

(52) U.S. Cl.
CPC ........... *H04W 16/10* (2013.01); *H04W 48/16* (2013.01); *H04W 72/0453* (2013.01)

(58) Field of Classification Search
None
See application file for complete search history.

(56) References Cited

U.S. PATENT DOCUMENTS

| 2015/0119053 A1* | 4/2015 | Morimoto | H04W 52/34 455/450 |
| 2021/0058856 A1 | 2/2021 | Qi et al. | |
| 2021/0385688 A1 | 12/2021 | Liu et al. | |
| 2022/0060941 A1 | 2/2022 | Suh et al. | |
| 2023/0232242 A1* | 7/2023 | Palayur | H04W 24/02 455/454 |

FOREIGN PATENT DOCUMENTS

| WO | 2021021016 A1 | 2/2021 |
| WO | 2022011685 A1 | 1/2022 |

* cited by examiner

*Primary Examiner* — Saad Khawar
(74) *Attorney, Agent, or Firm* — Merchant & Gould P.C.

(57) ABSTRACT

Dynamic channel assignment for 6 GHz radios may be provided. Whether an access point in a network is classified as low power indoor only (LPI only), standard power optional (SP optional), or standard power mandatory (SP mandatory) is determined. The total number of access points in the network and the number of access points classified as SP optional or SP mandatory is determined. If the number of SP optional and SP mandatory access points is more than a determined proportion of the total number of access points, for SP optional and SP mandatory access points, channels having a frequency below a determined power spectral frequency are cut off.

24 Claims, 7 Drawing Sheets

ADAPTIVE CHANNEL ASSIGNMENT FOR 6GHZ RADIOS

TECHNICAL FIELD

This patent document relates to channel assignments, and more particularly to adaptive channel assignments for 6 GHz radios

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Dynamic channel assignment for 6 GHz radios may be provided. Whether an access point in a network is classified as Low Power Indoor only (LPI), Standard Power Optional (SP Optional), or Standard Power Mandatory (SP Mandatory) is determined. The total number of access points in the network and the number of access points classified as SP optional or SP mandatory is determined. If the number of SP optional and SP mandatory access points is more than a determined proportion of the total number of access points, for SP optional and SP mandatory access points, channels having a frequency below a determined power spectral frequency are cut off.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Examples

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Figure 1:
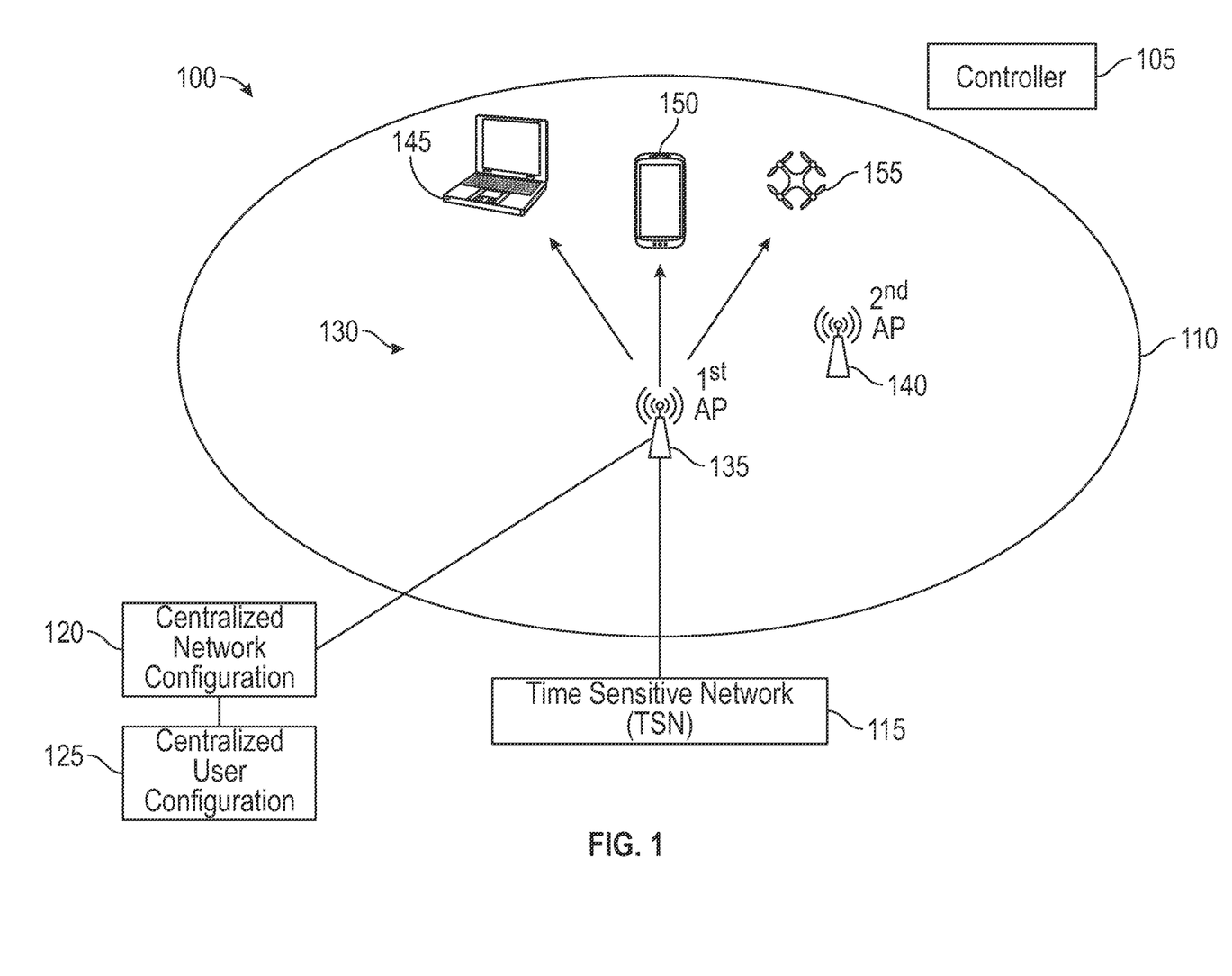
FIG. 1 is a block diagram of an operating environment for providing bi-directional gates for scheduling.

FIG. 1 shows an operating environment 100 for providing bi-directional gates for scheduling. As shown in FIG. 1, operating environment 100 may comprise a controller 105, a coverage environment 110, a Time Sensitive Network (TSN) 115, a Centralized Network Configuration (CNC) server 120, and a Centralized User Configuration (CUC) 125 server. Coverage environment 110 may comprise, but is not limited to, a Wireless Local Area Network (WLAN) comprising a plurality of stations 130. The plurality of stations 130 may comprise a plurality of Access Points (APs) or stations and a plurality of client devices. The AP's may include 6E radios that operate using the 6 GHz spectrum. Some of the AP's also my operate at 2.4 GHz or 5 GHz. Additionally, AP's that are co-located in a building or at another site might be on a common network and organized into neighborhoods or radio frequency (RF) neighborhoods.

At any given time, any one of the plurality of stations 130 may comprise an Initiating Station (ISTA) or a Responding Station (RSTA). The plurality of APs may provide wireless network access (e.g., access to the WLAN) for the plurality of client devices. The plurality of APs may comprise a first AP 135 and a second AP 140. Each of the plurality of APs may be compatible with specification standards such as, but not limited to, the Institute of Electrical and Electronics Engineers (IEEE) 802.11 specification standard for example. Coverage environment 110 may comprise, but is not limited to, an outdoor wireless environment, such as a mesh (e.g., a Wi-Fi mesh). Embodiments of the disclosure also may apply to indoor wireless environments and non-mesh environments.

One of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device. In the example shown in FIG. 1, the plurality of client devices may comprise a first client device 145 (e.g., a laptop computer), a second client device 150 (e.g., a smart phone), and a third client device 155 (e.g., a drone).

Controller 105 may comprise a Wireless Local Area Network controller (WLC) and may provision and control operating environment 100 (e.g., the WLAN). Controller 105 may allow the plurality of client devices to join the operating environment 100. In some embodiments of the disclosure, controller 105 may be implemented by a Digital Network Architecture Center (DNAC) controller (i.e., a Software-Defined Network (SDN) controller) that may configure information for operating environment 100.

The elements described above of operating environment 100 (e.g., controller 105, CNC server 120, CUC, 125 server, first AP 135, second AP 140, first client device 145, second client device 150, and third client device 155) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

In the spring of 2020, the Federal Communications Commission (FCC) issued a new report and order that approved 1200 MHz of new spectrum for Wi-Fi transmissions, in the 5.925 GHz to 7.125 GHz spectrum, commonly referred to 6 GHz, the 6 GHz spectrum, or the like. Soon after, Canada followed suite. Then the European Telecommunication Standards Institute (ETSI) allowed 500 MHz in the same frequency range. This vast spectrum creates unique opportunities for Wi-Fi vendors and an overall tremendous increase in the Wi-Fi capacity and performance.

A purpose for the new 6 GHz spectrum is maximizing the performance of High-Efficiency WiLAN (HEW) stations. Additionally, the 1200 MHz spectrum enables 6E radios to use channels having a bandwidth of 160 MHz. 160 MHz channels also were supported on Wave2 radios, but there were very limited scenarios in which such wide-band configurations could be achieved. With the 6 GHz spectrum supporting 7+ 160 MHz channels and 14+80 MHz channels, legacy Dynamic Channel Assignment (DCA) functions can no longer achieve channelization that is mainly focused on maximizing the throughput of HEW stations in this new 6 GHz spectrum. This patent document introduces a new 6 GHz specific channel allocation algorithm.

Channel allocation for 6 GHz radios provides a new set of technical challenges there were not applicable to radios with smaller bandwidths. For example, different regulatory bodies allow different frequencies. The FCC allows 1200 MHz of spectrum in the United States and that broad spectrum enables many 160 MHz channel assignments. In contrast, ETSI allows only 500 MHz of spectrum, which makes 160 MHz channel assignment less practical. Furthermore, a fixed power spectral density has many advantages for HEW stations, but the impact of co-channel contention due to variable Effective isotropic Radiated Power (EiRP) over higher bandwidths needs to be assessed for optimal performance of these stations. Additionally, 6E stations biasing their channel scan towards preferred scanning channels (PSC) would require new methods to assign radio operational frequencies towards a station's preferred channels.

To maximize an AP's performance, methods commonly focus on wide bandwidth channelization to increase overall capacity of the network and station throughput. Typically, DCA methods focus on the holistic view of the network, and the cost function is primarily optimized towards reducing contention based on the available spectrum.

While these challenges are also pertinent for transmissions by HEW's in the 2.4 GHz and 5 GHz spectrums, with a new spectrum that has more than twice the number of frequencies than is supported by the 5 GHz spectrum, existing contention-based channel allocation will yield to suboptimal results. Therefore, the cost functions and objectives of 6E DCA methods are focused on HEW station network discovery, performance, and minimizing channel updates on the standard power access points.

There are at least three example techniques for handling these issues including support adaptive bandwidth based on incumbent density and regulatory conditions; reducing misalignment between neighboring access points; and offering the best suitable channelization to increase HEW station performance and maximize channel reuse.

Figure 2:
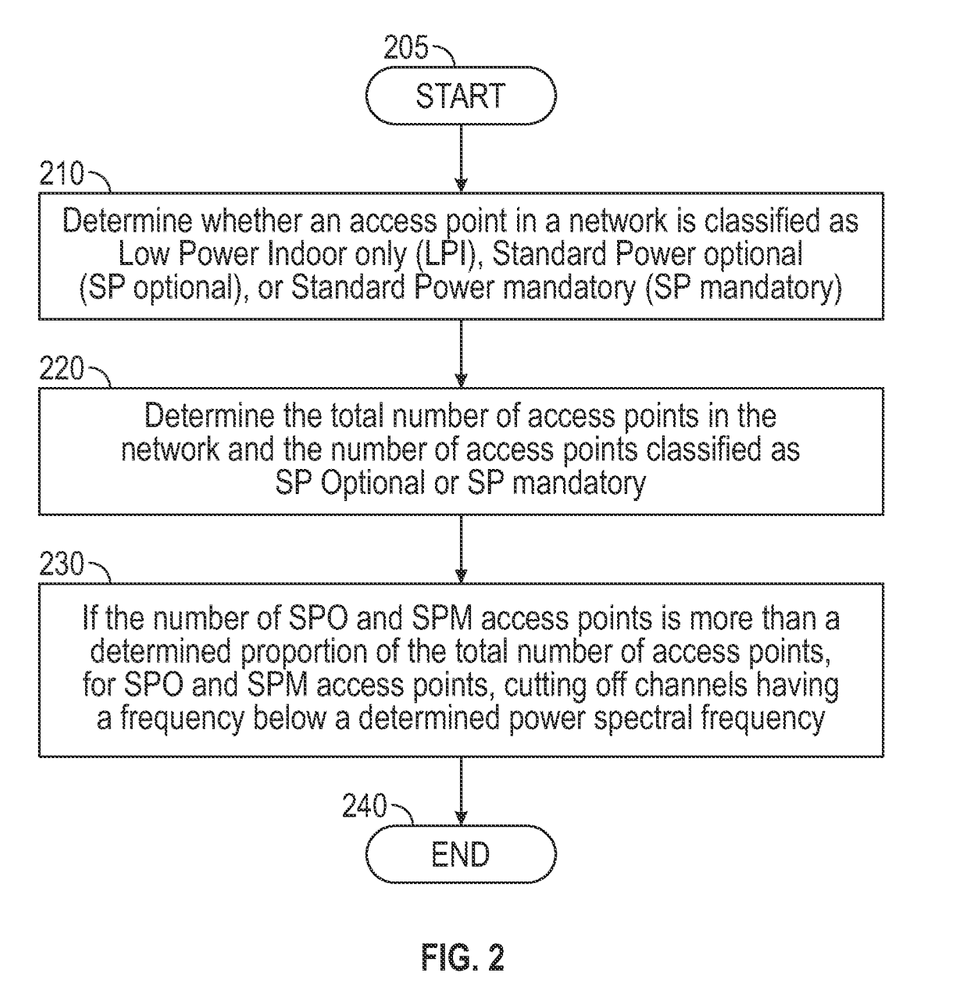
FIG. 2 is a flowchart illustrating an example process for adaptive channel assignment for 6E radios.

FIG. 2 is a flow chart illustrating one possible embodiment for a process of adaptive bandwidth selection. This process starts at 205. Operation 210 determines whether an access point in a network is classified as Low Power Indoor only (LPI only), Standard Power optional (SP optional), or Standard Power mandatory (SP mandatory). Operation 215 determines the total number of access points in the network and the number of access points classified as SP Optional or SP mandatory. If the number of SP optional and SP mandatory access points are more than a determined proportion of the total number of APs, Operation 220 cuts off channels having a frequency below a determined power spectral frequency for SP optional and SP mandatory access points. The process ends at 225.

Adaptive baseline bandwidth selection is based, at least in part, on regulatory conditions and a presence of the nearby incumbents that define a suitable baseline bandwidth for a building or other site. The baseline bandwidth would bias a channel assignment algorithm to cater to the needs of HEW performance and optimal coverage.

Figure 3:
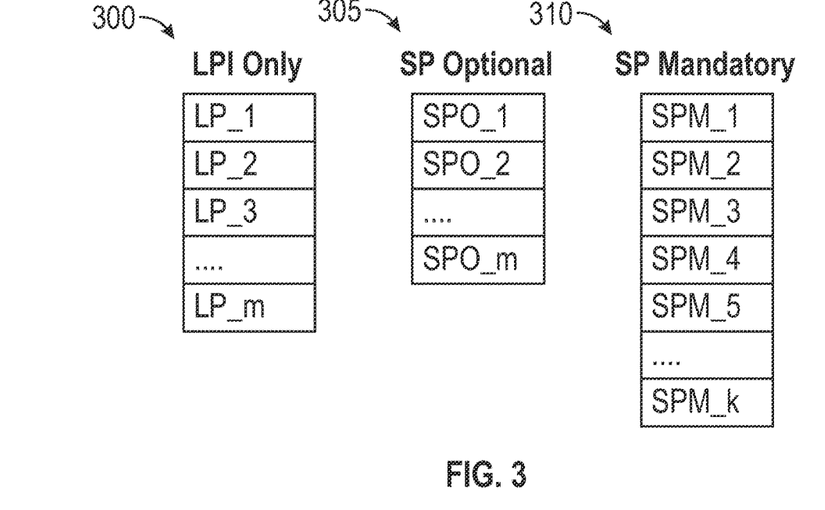
FIG. 3 is an illustration of organizing channels for a 6E radio.

Referring to FIG. 3, an example embodiment of an adaptive baseline bandwidth selection groups 6E APs candidates into three buckets 300, 305, 310 based on the capability of their hardware. An LPI bucket 300 includes LPI only APs. This class of APs support indoor APs with integrated antennas and hardware that does not support radios operating at standard power. An SP optional bucket 305 includes SP optional APs. SP optional APs are APs with integrated antennas and hardware that supports SPI operations. These APs are eligible to operate at standard power. and they can selectively operate at standard power or at a lower power. An SP mandatory bucket 310 includes SP mandatory APs. SP mandatory APs include indoor APs having external antennas. The SP mandatory bucket 310 also includes outdoor access points APs with either internal or external antennas that require automated frequency coordination (AFC) for standard power operations.

Total channel availability is determined based on the intersection of frequencies allowed in different regulatory domains or countries and on user channel selection such as specified channels in a DCA list. The list of total available channels is then narrowed down for a given deployment at a building or other site. The total distribution of AP candidates eligible to operate at standard power then may be evaluated. If the total number of standard power eligible APs is more than 50% of the available AP candidates, the method evaluates the Power Spectral Density (PSD) limits in dBm/MHz for UNII-5 and UNII-7 frequencies from the AFC system. This operation may use the relationships defined in equation (1):

$$\text{total\_avail\_count} = [\{\text{Country\_Allowed \&\& User\_Input}\} - \{\text{SUM(UNII5\_freq<psd\_cutoff)} + \text{SUM(UNII5\_freq\_not\_allowed)}\} - \{\text{SUM(UNII7\_freq<psd\_cutoff)} + \text{SUM(UNII7\_freq\_not\_allowed)}\}] \quad (1)$$

where psd_cutoff={static_threshold|6 GHz_Optimal_PSD|Estimated_PSD (5 GHz_Density+Spec_Coefficient)}

The process further trims down the list of available channels based on a set of frequencies that are not allowed, by the AFC system, over a specific PSD budget. A PSD cutoff can be a defined threshold. For example, frequencies that have a power density below a determined threshold (e.g., psd<=−5 dBm/MHz). Alternatively, the list of available channels can be trimmed based on the total power output (TPO)/EiRP requirements computed by leveraging an existing 5 GHz cell size minus the spectrum coefficient or by the 6 GHz transmit power control algorithm that evaluates the optimal cell size for a given density of APs.

The process also generates channel availability buckets by bandwidths. An optimal baseline bandwidth for the localized radio frequency (RF) neighborhood is determined by the minimum number of channels supported by the highest bandwidth. This number can be a static threshold or dynamically determined by a channel reuse index calculated by a neighborhood density metrics score.

Additionally, a subset of 6 GHz green field stations supports a 20 MHz-only mode. In a portion of a network where a majority of the stations are operating with 20 MHz-only capability, a baseline bandwidth can be reduced to 20 MHz to maximize channel reuse for the rest of the network. The baseline bandwidth can be determined according to equation (2):

$$\text{Baseline\_BW} = \text{Highest\_BW, when Frequency count (Highest\_BW\_Freq\_List)} >= \text{Chan\_Reuse\_Index} \quad (2)$$

The baseline bandwidth can be recomputed at the end of each channel assignment cycle.

Figure 4:
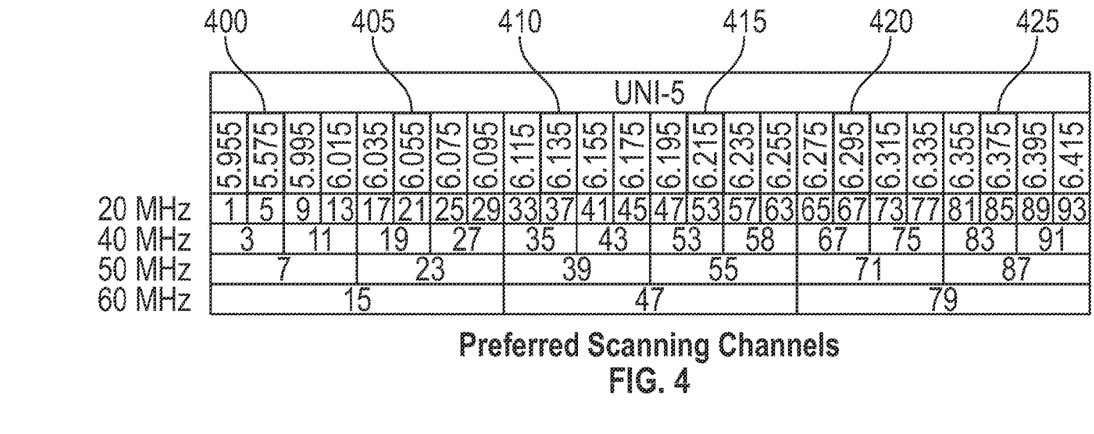
FIG. 4 is an illustration of preferred scanning channels for a 6E radio.

Referring now to FIG. 4, channel misalignment via PSC-driven channelization can be reduced. Due to the large availability of the spectrum, the 6 GHz spectrum offers many sets of wider bandwidth channelization and offers fifteen 80 MHz channels and seven 160 MHz channels. Similar to the 5 GHz spectrum, bonding among the channels is predefined by the standard. Cleaner environment industry wide channel allocation schemes typically index the first channel as the primary channel and other channels as extension channels.

This reduction of channelization is commonly used to avoid channel misalignment with neighboring wireless networks. However, to expedite 6E client association and minimize roaming delays, current standards offer preferred scanning channels (PSC) 400, 405, 410, 415, 420, 425 that allow stations to scan a subset of the frequencies in the spectrum. This PSC channelization starts at 5.975 MHz instead of the first frequency of in the 6 GHz spectrum (i.e., 5.955 MHz). Therefore, traditional channel allocation would lead to more channel misalignment conditions. In this example embodiment, however, 6 GHz channel assignments are biased toward PSC by influencing channel indexing. This biasing generates a higher probability that primary channel aligns with the preferred scanning channels and minimizes misalignment conditions.

While 6E APs operate at a bandwidth higher than the bandwidth used by earlier APs, the coverage for the 6E APs will not increase over the coverage provided by these earlier APs. However, 6E APs will increase co-channel contention to their neighboring APs. To minimize this contention the processes disclosed herein may support a PSD based on connected communities infrastructure (CCI) compensation where $\text{CCI\_Compensation}_{(PSD)} = \text{SIR}_{(aw\_adjustment)}$.

Figure 5A:
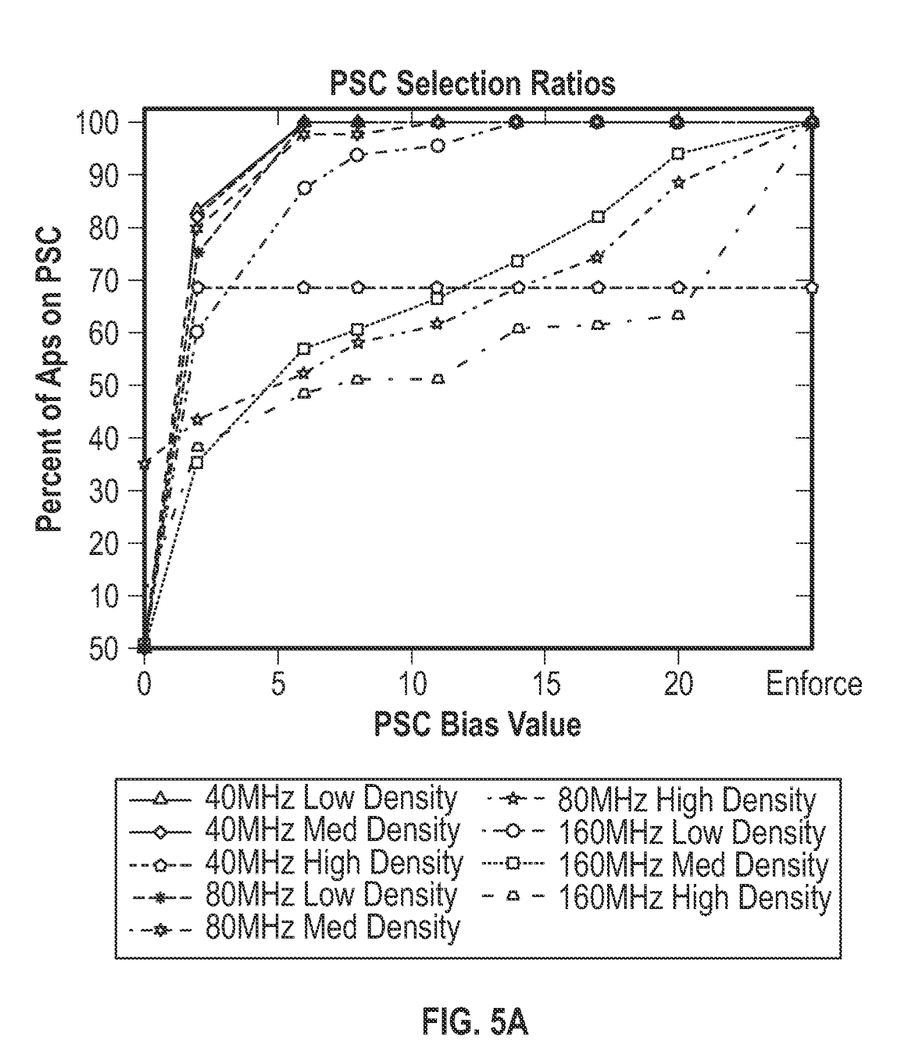
FIGS. 5A-5C are charts document the performance of adaptive channel assignments for 6E radios.
Figure 5B:
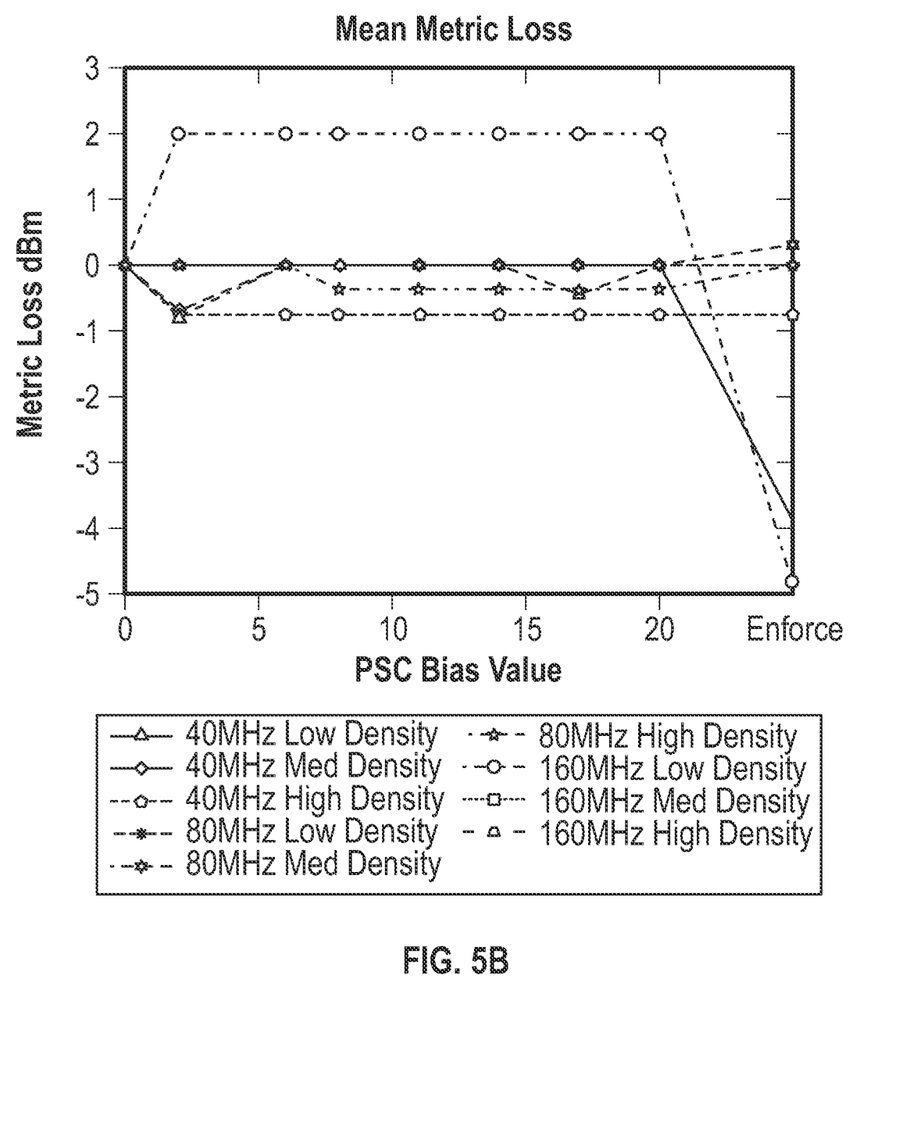
Figure 5C:
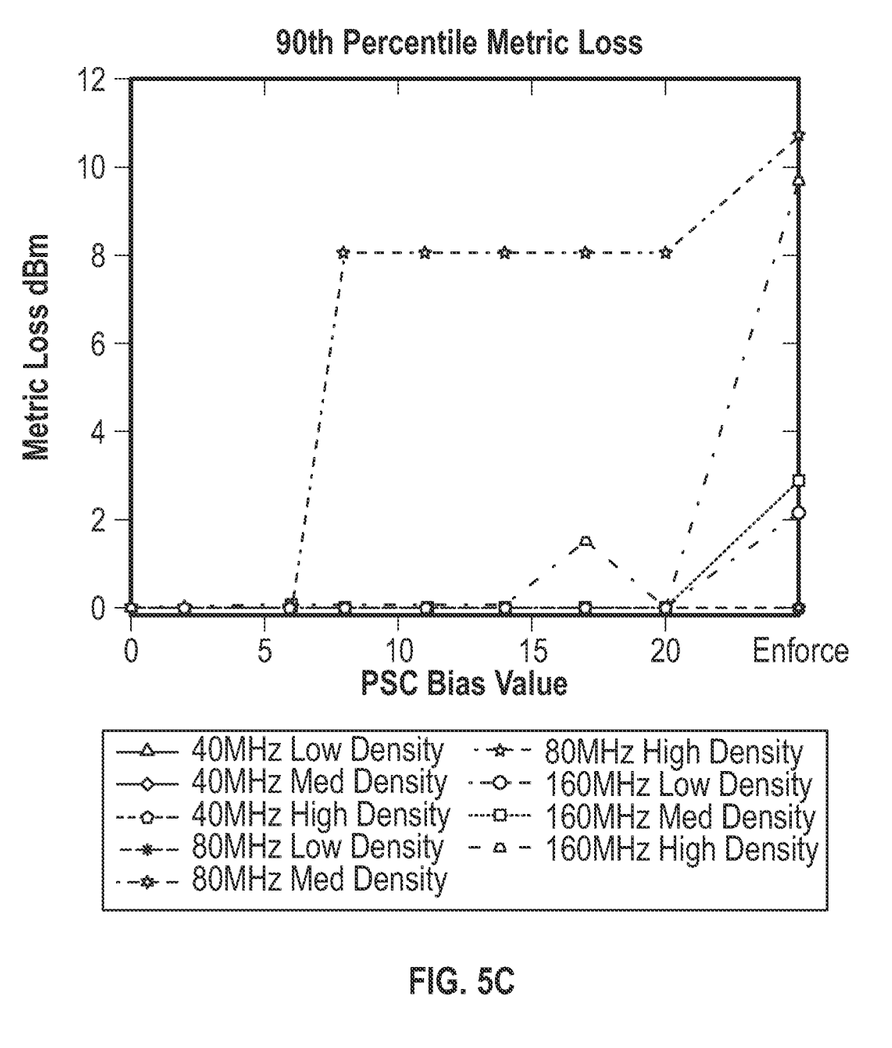

At least some embodiments can use automatic PSC enforcement. As discussed herein, a PSC list supports a set of frequencies that allow stations to scan a subset of frequencies during association and roaming. PSCs enable faster roaming. But they also can result in wastage of the 6 GHz spectrum when narrow bandwidth channelization is deemed necessary. Because consecutive PSC channels are spaced apart by 80 MHz in high density deployments where 20 MHz or 40 MHz channel assignments are more suitable, enforcing a primary channel can cause more than 50% of the 6 GHz spectrum to not be utilized. Automatic PSC enforcement utilizing RF impact on the 6E APs and HEW stations maintains a trade-off between a decrease in station roaming delays while not wasting 6 GHz spectrum. To show the effectiveness of automatic PSC enforcement as described herein, FIG. 5A is a chart documenting PSC selection ratios, FIG. 5B is a chart documenting mean metric loss, and FIG. 5C is a chart documenting the 90th percentile metric loss.

An example process of automatic PSC enforcement first calculates an RF neighborhood density of a given site. The RF density neighborhood of a neighborhood of APs is measured based on a weighted sum of the neighborhood density score along with proximity close to co-channel neighbors. The process then evaluates the baseline bandwidth of the localized neighborhood along with the channel distribution and bandwidth allocation in the current network. If 6E stations are going through 2.4 GHz or 5 GHz APs then there is no guarantee that 6 GHz channels advertised will be only within a set of PSCs, in which case bias can be either minimal or can be applied to treat all channels equally. The process further computes station association trends for both 5 GHz and 6 GHz radios per AP. Station count, average Tx MCS Rate, RxUtil, TxUtil, and historical traffic benchmark (when available) are measured, thereby measuring HEW station density and performance requirements. For a given neighborhood density, the process evaluates the PSC bias impact on the metrics loss. Both the 90th percentile and overall mean metrics loss are benchmarked against the cost function. An iteration then starts by first enforcing PSC (100% radios on PSC channels) and gradually reducing PSC bias towards 0.

This example process also evaluates presence of collocated 2.4 GHz and 5 GHz radios. If the 2.4 GHz and 5 GHz radios are disabled or not present, PSC is enforced in the network to minimize station association starvation. If collocated 2.4 GHz and 5 GHz radios are enabled, more of a gradual bias is applied using the operations described herein. Finally, the optimal bias that leads to the minimal reduction in the overall channel quality metrics will be selected for the local site.

Figure 6:
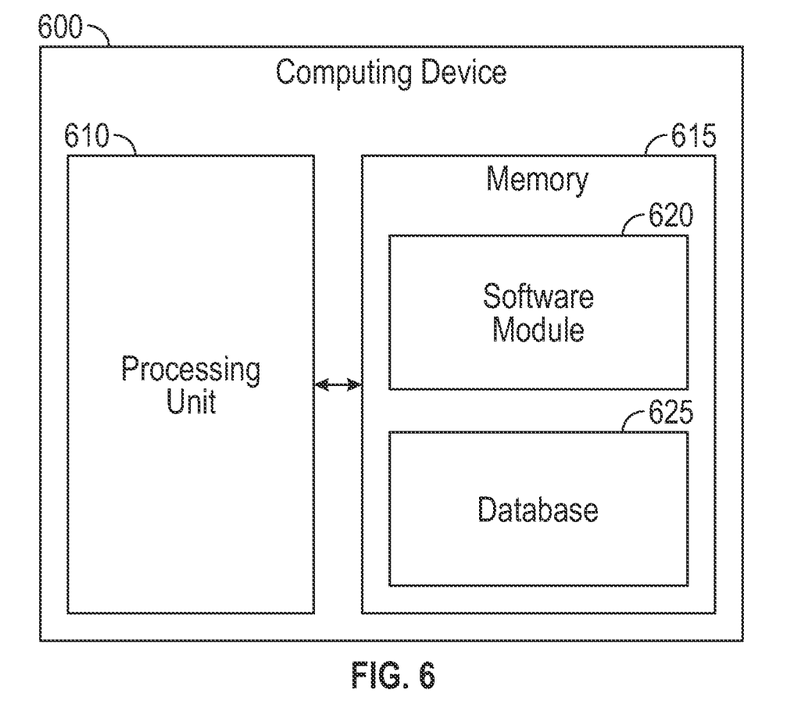
FIG. 6 is a block diagram of a computing device

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for adaptive baseline bandwidth selection, reducing misalignment via PSC driven channelization, and automatic PSC enforcement as described herein.

Computing device 600 may be implemented using a Wi-Fi access point, a tablet device, a mobile device, a smart phone, a telephone, a remote-control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of intransient instructions for executing a computer process. The computer program product also may be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having intransient computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements disclosed herein may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The methods, systems, computer-readable medium disclosed herein have many aspects including the following.

One aspect is a system of adaptive channel assignments. The system comprises memory storage and a processing unit disposed in a station and in data communication with the memory storage. The processing unit is operative to determine whether an access point in a network is classified as low power indoor only (LPI only), standard power optional (SPO), or standard power mandatory (SPM) determine the total number of access points in the network and the number of access points classified as SP Optional or SP mandatory; and if the number of SPO and SPM access points is more than a determined proportion of the total number of access points, for SPO and SPM access points, cutting off channels having a frequency below a determined power spectral frequency.

Another aspect is a system, alone or in any combination with the previous embodiments and aspects disclosed herein, wherein the processing unit is operative to, for access points in the network, determine a bandwidth for available channels, each available channel having radio frequency (RF) neighborhood; and determine a baseline bandwidth for each RF neighborhood, the baseline bandwidth being determined by the minimum number of channels supported by the highest bandwidth.

Another aspect is a system, alone or in any combination with the previous embodiments and aspects disclosed herein, wherein the minimum number of channels has a static value.

Another aspect is a system, alone or in any combination with the previous embodiments and aspects disclosed herein, wherein the minimum number of channels is dynamic and determined by the equation Baseline_$BW_{(Localized\_Neighborhood\_x)}$=Highest_BW, when Frequency count (Highest_BW_Freq_List)>=Chan_Reuse_Index.

Another aspect is a system, alone or in any combination with the previous embodiments and aspects disclosed herein, wherein the processor is operative to set the baseline bandwidth to 20 MHz for the network when more than a determined proportion of access points are operating only in a 20 MHz mode.

Another aspect is a system, alone or in any combination with the previous embodiments and aspects disclosed herein, wherein the processor is operative to bias channels for access points operating in a 6 GHz spectrum to preferred scanning channels (PSC).

Another aspect is a system, alone or in any combination with the previous embodiments and aspects disclosed herein, wherein the processor is configured to determine if an access point operating the 6 GHz mode and a PSC is receiving interference from another access point, generating a request for another access point to change to a different channel.

Another aspect is a system, alone or in any combination with the previous embodiments and aspects disclosed herein, wherein the processor is operative to determine a radio frequency (RF) neighborhood density of a neighborhood of access points, the RF neighborhood density being based on a weighted sum of the RF neighborhood density score along with proximity close to co-channel neighbors, evaluate the baseline bandwidth of the neighborhood of access points along with the channel distribution and bandwidth allocation in the current network, bias at least some of the channels toward PSC frequencies; measure a HEW station density and performance requirements, evaluate an impact of the PSC biasing on a metric loss, benchmark the 90th percentile metric loss and the overall mean metrics loss against the cost function, enforce the PSC bias, reduce the PSC bias, if PSC bias is not zero then repeat action reduce the PSC bias again.

Another aspect is a method, alone or in any combination with the previous embodiments and aspects disclosed herein, wherein the method comprises determining whether an access point in a network is classified as low power indoor only (LPI only), standard power optional (SPO), or standard power mandatory (SPM); determining the total number of access points in the network and the number of access points classified as SP Optional or SP mandatory; and if the number of SPO and SPM access points is more than a determined proportion of the total number of access points, for SPO and SPM access points, cutting off channels having a frequency below a determined power spectral frequency.

Another aspect is a method, alone or in any combination with the previous embodiments and aspects disclosed herein, wherein the method comprises for access points in the network, determining a bandwidth for available channels, each available channel having radio frequency (RF) neighborhood; and determining a baseline bandwidth for each RF neighborhood, the baseline bandwidth being determined by the minimum number of channels supported by the highest bandwidth.

Another aspect is a method, alone or in any combination with the previous embodiments and aspects disclosed herein, wherein the minimum number of channels has a static value.

Another aspect is a method, alone or in any combination with the previous embodiments and aspects disclosed herein, wherein the minimum number of channels is dynamic and determined by the equation Baseline_$BW_{(Localized\_Neighborhood\_x)}$=Highest_BW, when Frequency count (Highest_BW_Freq_List)>=Chan_Reuse_Index.

Another aspect is a method, alone or in any combination with the previous embodiments and aspects disclosed herein, wherein the method comprises determining the baseline bandwidth to 20 MHz for the network is performed when more than a determined proportion of access points are operating only in a 20 MHz mode.

Another aspect is a method, alone or in any combination with the previous embodiments and aspects disclosed herein, wherein the method comprises biasing channels for access points operating in a 6 GHz spectrum to preferred scanning channels (PSC).

Another aspect is a method, alone or in any combination with the previous embodiments and aspects disclosed herein, wherein the method comprises generating a request for another access point to change to a different channel if an access point operating the 6 GHz mode and a PSC is receiving interference from another access point.

Another aspect is a method, alone or in any combination with the previous embodiments and aspects disclosed herein, wherein the method comprises determining a radio frequency (RF) neighborhood density of a neighborhood of access points, the RF neighborhood density being based on a weighted sum of the RF neighborhood density score along with proximity close to co-channel neighbors; evaluating the baseline bandwidth of the neighborhood of access points along with the channel distribution and bandwidth allocation in the current network; biasing at least some of the channels toward PSC frequencies; measuring a HEW station density and performance requirements; evaluating an impact of the PSC biasing on a metric loss; benchmarking the 90th percentile metric loss and the overall mean metrics loss against the cost function; enforcing the PSC bias; reducing the PSC bias again if the PSC bias is not zero.

Another aspect is a computer-readable medium that stores a set of intangible instructions, alone or in any combination with the previous embodiments and aspects disclosed herein, which when executed perform a method executed by the set of instruction, the method comprising determining whether an access point in a network is classified as low power indoor only (LPI only), standard power optional (SPO), or standard power mandatory (SPM); determining the total number of access points in the network and the number of access points classified as SP Optional or SP mandatory; and if the number of SPO and SPM access points is more than a determined proportion of the total number of access points, for SPO and SPM access points, cutting off channels having a frequency below a determined power spectral frequency.

Another aspect is a computer-readable medium that stores a set of intangible instructions, alone or in any combination with the previous embodiments and aspects disclosed herein, which when executed perform a method executed by the set of instruction, the method comprising, for access points in the network, determining a bandwidth for available channels, each available channel having radio frequency (RF) neighborhood, and determining a baseline bandwidth for each RF neighborhood, the baseline bandwidth being determined by the minimum number of channels supported by the highest bandwidth.

Another aspect is a computer-readable medium that stores a set of intangible instructions, alone or in any combination with the previous embodiments and aspects disclosed herein, which when executed perform a method executed by the set of instruction, wherein the minimum number of channels has a static value.

Another aspect is a computer-readable medium that stores a set of intangible instructions, alone or in any combination with the previous embodiments and aspects disclosed herein, which when executed perform a method executed by the set of instruction, wherein the minimum number of channels is dynamic and determined by the equation Baseline_$BW_{(Localized\_Neighborhood\_x)}$=Highest_BW, when Frequency count (Highest_BW_Freq_List)>=Chan_Reuse_Index.

Another aspect is a computer-readable medium that stores a set of intangible instructions, alone or in any combination with the previous embodiments and aspects disclosed herein, which when executed perform a method executed by the set of instruction, the method comprising determining the baseline bandwidth to 20 MHz for the network is performed when more than a determined proportion of access points are operating only in a 20 MHz mode.

Another aspect is a computer-readable medium that stores a set of intangible instructions, alone or in any combination with the previous embodiments and aspects disclosed herein, which when executed perform a method executed by the set of instruction, the method comprising biasing channels for access points operating in a 6 GHz spectrum to preferred scanning channels (PSC).

Another aspect is a computer-readable medium that stores a set of intangible instructions, alone or in any combination with the previous embodiments and aspects disclosed herein, which when executed perform a method executed by the set of instruction, the method comprising generating a request for another access point to change to a different channel if an access point operating the 6 GHz mode and a PSC is receiving interference from another access point.

Another aspect is a computer-readable medium that stores a set of intangible instructions, alone or in any combination with the previous embodiments and aspects disclosed herein, which when executed perform a method executed by the set of instruction, the method comprising determining a radio frequency (RF) neighborhood density of a neighborhood of access points, the RF neighborhood density being based on a weighted sum of the RF neighborhood density score along with proximity close to co-channel neighbors, evaluating the baseline bandwidth of the neighborhood of access points along with the channel distribution and bandwidth allocation in the current network, biasing at least some of the channels toward PSC frequencies, measuring a HEW station density and performance requirements, evaluating an impact of the PSC biasing on a metric loss, benchmarking the 90th percentile metric loss and the overall mean metrics loss against the cost function, enforcing the PSC bias, reducing the PSC bias, reducing the PSC bias again if the PSC bias is not zero.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. As system comprising:
   memory storage; and
   a processing unit disposed in a station and in data communication with the memory storage, the processing unit operative to:
   determine whether an access point in a network is classified as low power indoor only (LPI only), standard power optional (SPO), or standard power mandatory (SPM);
   determine a total number of access points in the network and a number of access points classified as SP Optional or SP mandatory; and
   if the number of SPO and SPM access points is more than a determined proportion of the total number of access points, for SPO and SPM access points, cutting off channels having a frequency below a determined power spectral frequency.

2. The system of claim 1 wherein the processing unit is further operative to:
   for access points in the network, determine a bandwidth for available channels, each available channel having radio frequency (RF) neighborhood; and
   determining a baseline bandwidth for each RF neighborhood, the baseline bandwidth being determined by the minimum number of channels supported by the highest bandwidth.

3. The system of claim 2 wherein the minimum number of channels has a static value.

4. The system of claim 2 wherein the minimum number of channels is dynamic and determined by the equation Baseline_$BW_{(Localized\_Neighborhood\_x)}$=Highest_BW, when Frequency count (Highest_BW_Freq_List)>=Chan_Reuse_Index.

5. The system of claim 1 wherein the processor is further operative to set a baseline bandwidth to 20 MHz for the network when more than a determined proportion of access points are operating only in a 20 MHz mode.

6. The system of claim 1 wherein the processor is further operative to bias channels for access points operating in a 6 GHz spectrum to preferred scanning channels (PSC).

7. The system of claim 6 wherein the processor is further configured to determine if an access point operating the 6 GHz mode and a PSC is receiving interference from another access point, generating a request for another access point to change to a different channel.

8. The system of claim 1 wherein the processor is further operative to:
   (a) determine a radio frequency (RF) neighborhood density of a neighborhood of access points, the RF neighborhood density being based on a weighted sum of the RF neighborhood density score along with proximity close to co-channel neighbors;
   (b) evaluate a baseline bandwidth of the neighborhood of access points along with a channel distribution and bandwidth allocation in the network;
   (c) bias at least some of the channels toward PSC frequencies;
   (d) measure a HEW station density and performance requirements;
   (e) evaluate an impact of the PSC biasing on a metric loss;
   (f) benchmark a 90th percentile metric loss and a overall mean metrics loss against a cost function;
   (g) enforce the PSC bias;
   (h) reduce the PSC bias; and
   (i) if PSC bias is not zero then repeat action (h).

9. A method comprising:
   determining whether an access point in a network is classified as low power indoor only (LPI only), standard power optional (SPO), or standard power mandatory (SPM);
   determining a total number of access points in the network and a number of access points classified as SP Optional or SP mandatory; and
   if the number of SPO and SPM access points is more than a determined proportion of the total number of access points, for SPO and SPM access points, cutting off channels having a frequency below a determined power spectral frequency.

10. The method of claim 9 further comprising:
    for access points in the network, determining a bandwidth for available channels, each available channel having radio frequency (RF) neighborhood; and
    determining a baseline bandwidth for each RF neighborhood, the baseline bandwidth being determined by the minimum number of channels supported by the highest bandwidth.

11. The method of claim 10 wherein the minimum number of channels has a static value.

12. The method of claim 10 wherein the minimum number of channels is dynamic and determined by the equation $Baseline\_BW_{(Localized\_Neighborhood\_x)} = Highest\_BW$, when Frequency count (Highest_BW_Freq_List)>=Chan_Reuse_Index.

13. The method of claim 10 wherein determining the baseline bandwidth to 20 MHz for the network is performed when more than a determined proportion of access points are operating only in a 20 MHz mode.

14. The method of claim 9 further comprising biasing channels for access points operating in a 6 GHz spectrum to preferred scanning channels (PSC).

15. The method of claim 14 further comprising generating a request for another access point to change to a different channel if an access point operating the 6 GHz mode and a PSC is receiving interference from another access point.

16. The method of claim 9 further comprising:
    (a) determining a radio frequency (RF) neighborhood density of a neighborhood of access points, the RF neighborhood density being based on a weighted sum of the RF neighborhood density score along with proximity close to co-channel neighbors;
    (b) evaluating a baseline bandwidth of the neighborhood of access points along with a channel distribution and bandwidth allocation in the network;
    (c) biasing at least some of the channels toward PSC frequencies;
    (d) measuring a HEW station density and performance requirements;
    (e) evaluating an impact of the PSC biasing on a metric loss;
    (f) benchmarking a 90th percentile metric loss and a overall mean metrics loss against a cost function;
    (g) enforcing the PSC bias;
    (h) reducing the PSC bias; and
    (i) repeating action (h) if the PSC bias is not zero.

17. A computer-readable medium that stores a set of intangible instructions, which when executed perform a method executed by the set of instruction, the method comprising:
    determining whether an access point in a network is classified as low power indoor only (LPI only), standard power optional (SPO), or standard power mandatory (SPM);
    determining a total number of access points in the network and a number of access points classified as SP Optional or SP mandatory; and
    if the number of SPO and SPM access points is more than a determined proportion of the total number of access points, for SPO and SPM access points, cutting off channels having a frequency below a determined power spectral frequency.

18. The computer-readable medium of claim 17 further comprising:
    for access points in the network, determining a bandwidth for available channels, each available channel having radio frequency (RF) neighborhood; and
    determining a baseline bandwidth for each RF neighborhood, the baseline bandwidth being determined by the minimum number of channels supported by the highest bandwidth.

19. The computer-readable medium of claim 18 wherein the minimum number of channels has a static value.

20. The computer-readable medium of claim 18 wherein the minimum number of channels is dynamic and determined by the equation $Baseline\_BW_{(Localized\_Neighborhood\_x)} = Highest\_BW$, when Frequency count (Highest_BW_Freq_List)>=Chan_Reuse_Index.

21. The computer-readable medium of claim 18 wherein determining the baseline bandwidth to 20 MHz for the network is performed when more than a determined proportion of access points are operating only in a 20 MHz mode.

22. The computer-readable medium of claim 17 further comprising biasing channels for access points operating in a 6 GHz spectrum to preferred scanning channels (PSC).

23. The computer-readable medium of claim 22 further comprising generating a request for another access point to change to a different channel if an access point operating the 6 GHz mode and a PSC is receiving interference from another access point.

24. The computer-readable medium of claim 17 further comprising:
    (a) determining a radio frequency (RF) neighborhood density of a neighborhood of access points, the RF neighborhood density being based on a weighted sum of the RF neighborhood density score along with proximity close to co-channel neighbors;
    (b) evaluating a baseline bandwidth of the neighborhood of access points along with a channel distribution and bandwidth allocation in the network;
    (c) biasing at least some of the channels toward PSC frequencies;
    (d) measuring a HEW station density and performance requirements;
    (e) evaluating an impact of the PSC biasing on a metric loss;
    (f) benchmarking a 90th percentile metric loss and a overall mean metrics loss against a cost function;
    (g) enforcing the PSC bias;
    (h) reducing the PSC bias; and
    (i) repeating action (h) if the PSC bias is not zero.

* * * * *